United States Patent
Huang et al.

(10) Patent No.: US 11,159,237 B2
(45) Date of Patent: Oct. 26, 2021

(54) DATA TRANSMISSION SYSTEM AND METHOD

(71) Applicant: Acer Incorporated, New Taipei (TW)

(72) Inventors: Yen-Shuo Huang, New Taipei (TW); Chih-Wen Huang, New Taipei (TW); Wen-Cheng Hsu, New Taipei (TW); Chao-Kuang Yang, New Taipei (TW); Ling-Fan Tsao, New Taipei (TW); Chueh-Pin Ko, New Taipei (TW); Chih-Chiang Chen, New Taipei (TW); Tai Ju, New Taipei (TW); Yu-Shan Ruan, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/887,757

(22) Filed: May 29, 2020

(65) Prior Publication Data
US 2021/0184766 A1 Jun. 17, 2021

(30) Foreign Application Priority Data
Dec. 11, 2019 (TW) .................... 108145282

(51) Int. Cl.
*H04B 10/116* (2013.01)
*H04L 1/00* (2006.01)
*H04B 10/50* (2013.01)

(52) U.S. Cl.
CPC ......... *H04B 10/116* (2013.01); *H04B 10/502* (2013.01); *H04L 1/0084* (2013.01)

(58) Field of Classification Search
CPC ............................................... H04B 10/11–116
See application file for complete search history.

(56) References Cited

U.S. PATENT DOCUMENTS

| | | | |
|---|---|---|---|
| 9,516,327 B2 | 12/2016 | Wang | |
| 10,142,017 B1* | 11/2018 | Keyes | .............. G06T 7/74 |
| 2007/0140697 A1* | 6/2007 | Miyake | ............ H04N 21/42222 398/106 |
| 2014/0086590 A1* | 3/2014 | Ganick | .................. G06Q 30/02 398/118 |
| 2018/0359030 A1* | 12/2018 | Hoekstra | ............ H04B 10/6971 |
| 2019/0355190 A1* | 11/2019 | Koo | ...................... G07C 9/257 |

FOREIGN PATENT DOCUMENTS

| | | |
|---|---|---|
| CN | 105930889 A | 9/2016 |
| WO | 2014/023197 A1 | 2/2014 |

* cited by examiner

*Primary Examiner* — Nathan M Cors
(74) *Attorney, Agent, or Firm* — McClure, Qualey & Rodack, LLP

(57) ABSTRACT

A data transmission system is provided in the invention. The data transmission system includes a transmitting device and a receiving device. The transmitting device encodes data into a color pattern, and displays the color pattern. The receiving device extracts the color pattern and decodes the color pattern to obtain the data.

10 Claims, 2 Drawing Sheets

DATA TRANSMISSION SYSTEM AND METHOD

CROSS REFERENCE TO RELATED APPLICATIONS

This application claims priority of TW Patent Application No. 108145282 filed on Dec. 11, 2019, the entirety of which is incorporated by reference herein.

BACKGROUND OF THE INVENTION

Field of the Invention

The invention generally relates to data transmission technology, and more particularly, to data transmission technology in which data is obtained by identifying colors.

Description of the Related Art

With the advances being made in science and technology, a user may have many different electronic devices. Different electronic devices may have different operation systems, and the transmission methods between different electronic devices and their operation systems may be different.

Data transmission methods may be divided into wire transmission and wireless transmission. For wire transmission, the connection between different electronic devices needs to be established thorough a transmission line (e.g. USB, fiber and so on.), as a result a higher cost will be incurred. In addition, different electronic devices may have different requirements for the transmission line, and therefore, it is not convenient for the user. For wireless transmission, the connection between different electronic devices is established through different wireless communication technologies, such as Bluetooth, Near-field communication (NFC), audio frequency, and so on, and the electronic devices can transmit data through the connection. However, the wireless transmission methods in use may have some inconvenience and limitations. For example, an electronic device needs to be paired with another electronic device to establish the connection, and the audio frequency may be vulnerable to signal interference and have more limitations for the use environment.

Therefore, how to transmit data through a more efficient method is a topic worthy of discussion.

BRIEF SUMMARY OF THE INVENTION

A data transmission system and a data transmission method are provided to overcome the problems described above.

An embodiment of the invention provides a data transmission system. The data transmission system comprises a transmitting device and a receiving device. The transmitting device encodes data into a color pattern, and displays the color pattern. The receiving device extracts the color pattern and decodes the color pattern to obtain the data.

In some embodiments of the invention, the transmitting device comprises an encoding device, wherein the encoding device encodes the data into the color pattern based on a plurality of colors. In some embodiments of the invention, when the encoding device encodes the data, the encoding device adds an initial bit and an end bit into the data. In some embodiments of the invention, the transmitting device comprises a color displaying device, wherein the color displaying device sequentially displays the plurality of colors comprised in the color pattern. In some embodiments of the invention, the color displaying device is a display device or a light-emitting diode (LED) device.

In some embodiments of the invention, the receiving device comprises an image extracting device to extract the color pattern. The receiving device comprises a decoding device to decode the color pattern extracted by the extracting device to obtain the data. The decoding device calculates the average of the pixel values of a plurality of frames of images every n frames, wherein the plurality of frames of images are obtained when the image extracting device extracts the color pattern, and n is an integer and is greater than or equal to 2.

In some embodiments of the invention, if the data is address data, when the receiving device obtains the address data, the receiving device establishes a connection with the transmitting device according to the address data.

An embodiment of the invention provides a data transmission method. The data transmission method comprises the steps of encoding, by a transmitting device, a data into a color pattern; displaying, by the transmitting device, the color pattern; extracting, by a receiving device, the color pattern; and decoding, by the receiving device, the color pattern to obtain the data.

Other aspects and features of the invention will become apparent to those with ordinary skill in the art upon review of the following descriptions of specific embodiments of the data transmission system and data transmission method.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
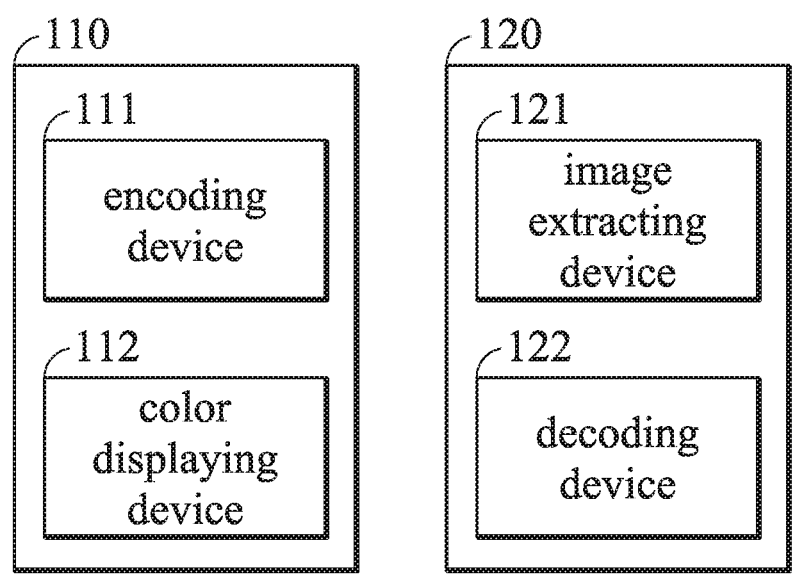
FIG. 1 is a block diagram of a data transmission system 100 according to an embodiment of the invention.

FIG. 1 is a block diagram of a data transmission system 100 according to an embodiment of the invention. As shown in FIG. 1, the data transmission system 100 may comprise a transmitting device 110 and a receiving device 120. It should be noted that in order to clarify the concept of the invention, FIG. 1 presents a simplified block diagram in which only the elements relevant to the invention are shown. However, the invention should not be limited to what is shown in FIG. 1.

According to the embodiments of the invention, the transmitting device 110 may be a desktop computer, a note book, a tablet or a smartphone, but the invention should not be limited thereto. According to the embodiments of the invention, the receiving device 120 may also be a desktop computer, a note book, a tablet or a smartphone, but the invention should not be limited thereto. For different applications, the transmitting device 110 may be regarded as a receiving device, and receiving device 120 may be regarded as a receiving device.

As shown in FIG. 1, according to an embodiment of the invention, the transmitting device may comprise an encoding device 111 and a color displaying device 112, but the invention should not be limited thereto. The transmitting device 110 may also comprise other elements.

According to an embodiment of the invention, the encoding device 111 may encode the data which the transmitting device 110 transmits to the receiving device 120 to a color pattern. According to the embodiments of the invention, the encoding device 111 may adopt a binary encoding method, an octal encoding method, a decimal encoding method or a hexadecimal encoding method to encode data, but the invention should not be limited thereto. According to the above encoding methods, the encoding device 111 may encode the data to the color pattern based on a plurality of colors. Specifically, in the binary encoding method, the encoding device 111 may encode the data to the color pattern based on two colors. If the encoding device 111 adopts the binary encoding method, the encoding device 111 may transform the data which the transmitting device 110 transmits to the receiving device 120 into the pre-defined binary codes, and then transform the binary codes into the corresponding color codes. In the octal encoding method, the encoding device 111 may encode the data to the color pattern based on eight colors. If the encoding device 111 adopts the octal encoding method, the encoding device 111 may transform the data which the transmitting device 110 transmits to the receiving device 120 into the pre-defined octal codes, and then transform the octal codes into the corresponding color codes. In the decimal encoding method, the encoding device 111 may encode the data to the color pattern based on ten colors. If the encoding device 111 adopts the decimal encoding method, the encoding device 111 may transform the data which the transmitting device 110 transmits to the receiving device 120 into the pre-defined decimal codes, and then transform the decimal codes into the corresponding color codes. In the hexadecimal encoding method, the encoding device 111 may encode the data to the color pattern based on sixteen colors. If the encoding device 111 adopts the hexadecimal encoding method, the encoding device 111 may transform the data which the transmitting device 110 transmits to the receiving device 120 into the pre-defined hexadecimal codes, and then transform the hexadecimal codes into the corresponding color codes. Tables 1-3 are used to an example for illustration below.

TABLE 1

| Characters (alphabet) | Binary Codes | Color Codes |
|---|---|---|
| A | 10111 | BWBBB (B: black W: white) |
| B | 111010101 | BBBWBWBWB |
| C | 11101011101 | BBBWBWBBBWB |
| D | 1110101 | BBBWBWB |
| E | 1 | B |

TABLE 1-continued

| Characters (alphabet) | Binary Codes | Color Codes |
|---|---|---|
| F | 101011101 | BWBWBBBWB |
| G | 111011101 | BBBWBBBWB |
| H | 1010101 | BWBWB |
| I | 101 | BWB |
| J | 1011101110111 | BWBBBWBBBWBBB |
| K | 111010111 | BBBWBWBBB |
| L | 101110101 | BWBBBW BWB |
| M | 1110111 | BBBWBBB |
| N | 11101 | BBBWB |
| O | 11101110111 | BBBWBBBWBBB |
| P | 10111011101 | BWBBBWBBBWB |
| Q | 1110111010111 | BBBWBBBWB WBBB |
| R | 1011101 | BWBBBWB |
| S | 10101 | BWBWB |
| T | 111 | BBB |
| U | 1010111 | BWBWBBB |
| V | 101010111 | BWBWBWBBB |
| W | 101110111 | BWBBBWBBB |
| X | 11101010111 | BBBWBWBWBBB |
| Y | 1110101110111 | BBBWBWBBBWBBB |
| Z | 11101110101 | BBBWBBBWBWB |

Table 1 shows the encoding results of the characters (alphabet) A~Z which are encoded by the binary encoding method according to an embodiment of the invention, but the invention should not be limited thereto. As shown in Table 1, black and white are used to encode the characters (alphabet) A~Z, but the invention should not be limited thereto.

TABLE 2

| Characters (number) | Binary codes | Color codes |
|---|---|---|
| 0 | 111011101110111011 1 | BBBWBBBWBBBWBBBWBBB |
| 1 | 1011101110111011 1 | BWBBBWBBBWBBB |
| 2 | 1010111011101 1 1 | BWBWBBBWBBBWBBB |
| 3 | 10101011101 1 1 | BWBWBWBBBWBBB |
| 4 | 1010101011 1 | BWBWBWBWBBB |
| 5 | 101010101 | BWBWBWBWB |
| 6 | 1 1 1 0 1 0 1 0 1 0 1 | BBBWBWBWBWB |
| 7 | 1 1 1 0 1 1 1 0 1 0 1 0 1 | BBBWBBBWBWBWB |
| 8 | 1 1 1 0 1 1 1 0 1 1 1 0 1 0 1 | BBBWBBBWBBBWBWB |
| 9 | 1 1 1 0 1 1 1 0 1 1 1 0 1 1 1 0 1 | BBBWBBBWBBBWBBBWB |

Table 2 shows the encoding results of the characters (number) 0~9 which are encoded by the binary encoding method according to an embodiment of the invention, but the invention should not be limited thereto. As shown in Table 1, black and white are used to encode the characters (number) 0~9, but the invention should not be limited thereto. For example, if the data which the transmitting device 110 transmits to the receiving device 120 is a media access control (MAC) address 02:00:00:00:00:00, the encoding device 111 may encode the MAC address according to the encoding method shown in Table 2 to generate a color pattern (as shown in Table 3 below). If the data which the transmitting device 110 transmits to the receiving device 120 is a media access control (MAC) address 02:13:45:67:8A:0D, the encoding device 111 may encode the MAC address according to the encoding methods shown in Tables 1 and 2 to generate a color pattern.

TABLE 3

| Characters | Binary codes | color pattern |
|---|---|---|
| 02:00:00:00:00:00 | 1 1 1 0 1 1 1 0 1 1 1 0 1 1 1 0 1 1 1 | B B B W B B B W B B B W B B B W B B B |
| | 1 0 1 0 1 1 1 0 1 1 1 0 1 1 1 | B W B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |
| | 1 1 1 0 1 1 1 0 1 1 1 0 1 1 1 0 1 1 1 | B B B W B B B W B B B W B B B W B B B |

TABLE 4

| Characters | Octal Codes | Color Codes |
|---|---|---|
| 0 | 0 | B(Black) |
| 1 | 1 | G(Green) |
| 2 | 2 | Y(Yellow) |
| 3 | 3 | R(Red) |
| 4 | 4 | BL(Blue) |
| 5 | 5 | W(White) |
| 6 | 6 | P(Pink) |
| 7 | 7 | LB(Light Blue) |
| 8 | 10 | GB(Green and Black) |

It should be noted that the encoding method shown in Tables 1~3 are used to illustrate the embodiments of the invention, but the invention should not be limited thereto. The encoding device 111 may adopt other colors or other encoding methods to encode the data. For example, Table 4 shows the encoding results of the characters (number) 0~8 which are encoded by the octal encoding method according to another embodiment of the invention, but the invention should not be limited thereto. As shown in Table 4, the characters (number) 0~8 are encoded by eight colors, but the invention should not be limited thereto.

In addition, it should be noted that the data which the transmitting device 110 transmits to the receiving device 120 should not be limited to the address data (MAC address). That is to say, in the embodiments of the invention, the transmitting device 110 transmits to the receiving device 120 also can be other types of data.

According to an embodiment of the invention, the data which the transmitting device 110 transmits to the receiving device 120 is address data, when the receiving device 120 obtains the address data, the receiving device 120 may establish a connection (e.g. Wi-Fi, but the invention should not be limited thereto) with transmitting device 110 according to the address data and perform the later data transmission with the transmitting device 110 through the established connection.

According to another embodiment of the invention, if the data which the transmitting device 110 transmits to the receiving device 120 is another type, the receiving device 120 also can decode the color pattern according to the data transmission methods provided in the embodiments of the invention to obtain the data from the transmitting device 110.

According to an embodiment of the invention, when the encoding device 111 encodes the data which the transmitting device 110 transmits to the receiving device 120, the encoding device 111 may add the initial bit and the end bit into the data. The encoding device 111 may transform the initial bit and the end bit into its corresponding color codes. Before the color displaying device 112 displays the color pattern, the color displaying device 112 may display the color code corresponding to the initial bit. For example, if the binary encoding method is adopted, the color code corresponding to the initial bit may be "BBBBB", but the invention should not be limited thereto. After the color displaying device 112 displays the color pattern, the color displaying device 112 may display the color code corresponding to the end bit. For example, if the binary encoding method is adopted, the color code corresponding to the end bit may be "WWWWW", but the invention should not be limited thereto.

According to an embodiment of the invention, when the encoding device 111 encodes the data which the transmitting device 110 transmits to the receiving device 120, the encoding device 111 may insert a relay bit between the characters (alphabet or number) of the data. If the data which the transmitting device 110 transmits to the receiving device 120 is an MAC address 02:13:45:67:8A;0D, the encoding device 111 may insert the relay bit between "0" and "2", insert the relay bit between "2" and "1", and so on. The encoding device 111 may transform the relay bit into its corresponding color code. For example, if the binary encoding method is adopted, the color code corresponding to the relay bit may be "WWW", but the invention should not be limited thereto.

According to an embodiment of the invention, after the encoding device 111 encodes the data which the transmitting device 110 transmits to the receiving device 120 to a color pattern, the color displaying device 112 of the transmitting device 110 may displays the color codes of the color pattern in order according to the color pattern generated by the encoding device 111. According to an embodiment of the invention, the color displaying device 112 may be a display device (e.g. screen of the mobile phone). When the color displaying device 112 is a display device, the display device may display different colors in order according to the color codes of the color pattern. According to an embodiment of the invention, the color displaying device 112 may be a Light-emitting diode (LED) device. When the color displaying device 112 is a LED device, the LED device may enable the LEDs with different colors in order according to the color codes of the color pattern.

Back to FIG. 1, according to an embodiment of the invention, the receiving device 120 may comprise an image extracting device 121 and a decoding device 122, but the invention should not be limited thereto. The receiving device may comprise other elements.

According to an embodiment of the invention, the image extracting device 121 of the receiving device 120 may extract the color pattern displayed by the color displaying device 112. Specifically, if the color displaying device 112 is a display device, the image extracting device 121 may photo the picture displayed on the display device to extract a plurality of frames of images (e.g. extracting 30 frames of pictures per second, but the invention should not be limited thereto). If color displaying device 112 is a LED device, the image extracting device 121 may photo the LEDs of the LED device to extract a plurality of frames of images (e.g. extracting 30 frames of pictures per second, but the invention should not be limited thereto).

According to an embodiment of the invention, the decoding device 122 may decode the color pattern extracted by the image extracting device 121 to obtain the data which the transmitting device 110 transmits to the receiving device 120. Specifically, the decoding device 122 may adopt the decoding method (e.g. binary decoding method, octal decoding method, decimal decoding method or hexadecimal decoding method) corresponding to the encoding method (e.g. binary encoding method, octal encoding method, decimal encoding method or hexadecimal encoding method) adopted by the encoding device 111, and according to the plurality of frames of the images of the color pattern extracted by the image extracting device 121 to identify the color displayed by the color displaying device 112 to decode the color pattern to obtain the data which the transmitting device 110 transmits to the receiving device 120.

According to an embodiment of the invention, when the decoding device 122 decodes the color pattern extracted by the image extracting device 121, the decoding device 122 may calculate the average of the pixel values of a plurality of frames of images every n frames, wherein n is an integer and is greater than or equal to 2. Then, the decoding device 122 may identify the colors displayed by the color displaying device 112 according to a plurality of frames of images which have been processed through average calculation to decode the color pattern to obtain the data which the transmitting device 110 transmits to the receiving device 120. For example, if the image extracting device 121 extracts 30 frames of images and the decoding device 122 perform the average calculation every 3 frames, the decoding device 122 may calculate the average of the pixel values from first frame of image to third frame of image (i.e. frames 1~3) to generate a first average image. Then, the decoding device 122 may calculate the average of the pixel values from second frame of image to fourth frame of image (i.e. frames 2~4) to generate a second average image. Then, the decoding device 122 may calculate the average of the pixel values from third frame of image to fifth frame of image (i.e. frames 3~5) to generate a third average image. That is to say, the decoding device 122 may perform the average calculation for each frame and its previous frame and its next frame. Accordingly, after the decoding device 122 performs the average calculation for all pixels of frames of images, the decoding device 122 may identify the colors displayed by the color displaying device 112 according to all average images to decode the color pattern to obtain the data which the transmitting device 110 transmits to the receiving device 120. It should be noted that, the above example is only used to illustrate the embodiment of the invention, but the invention should not be limited thereto.

According to an embodiment of the invention, when the decoding device 122 identify the initial bit, the decoding device 122 may start to decode the color pattern, and when the decoding device 122 identify the end bit, the decoding device 122 may end the decoding operation.

According to an embodiment of the invention, a plurality of receiving devices may extract the color patterns displayed by the color displaying device 112 respectively and decode the color patterns to obtain the data which the transmitting device 110 transmits to the receiving device 120.

Figure 2:
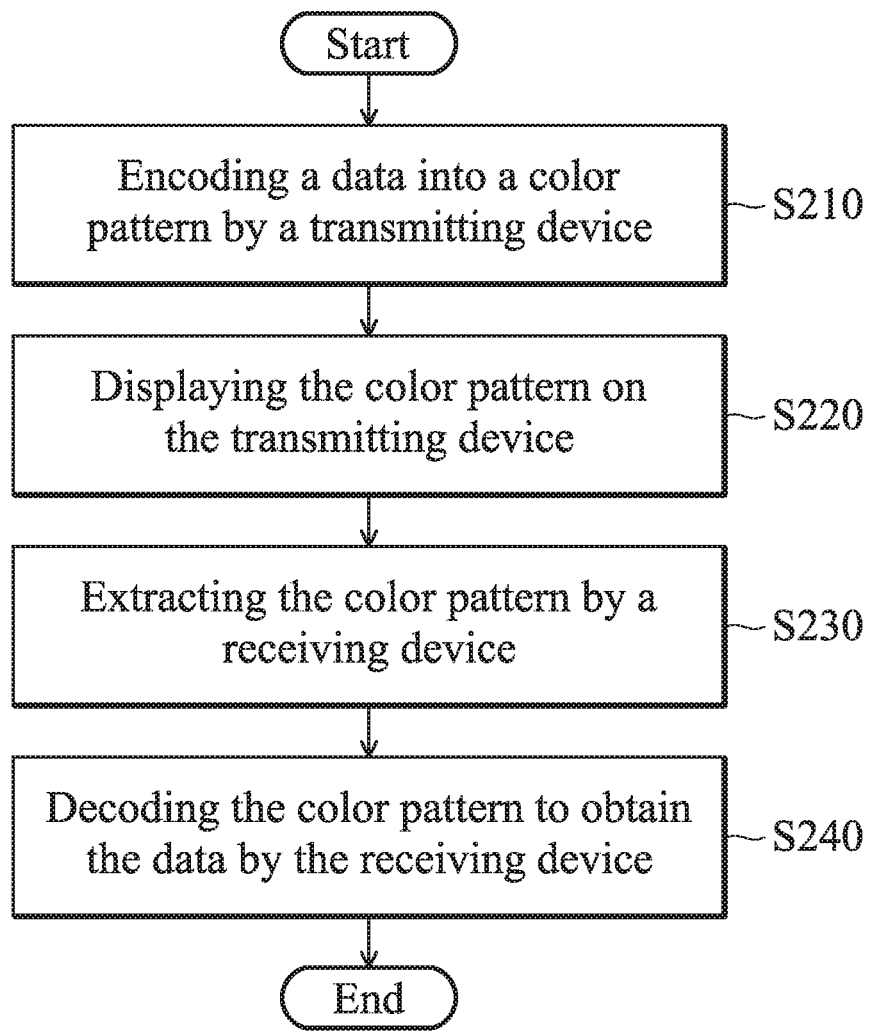
FIG. 2 is a flow chart 200 illustrating a data transmission method according to an embodiment of the invention.

FIG. 2 is a flow chart 200 illustrating a data transmission method according to an embodiment of the invention. The data transmission method can be applied to the data transmission system 100. As shown in FIG. 2, in step S210, a transmitting device of the data transmission system 100 encodes a data to a color pattern. In step S220, the color pattern is displayed by the transmitting device. In step S230, a receiving device of the data transmission system 100 extract the color pattern. In step S240, the receiving device decodes the color pattern to obtain the data.

According to an embodiment of the invention, the steps of the data transmission method further comprise that the data is encoded into a color pattern based on a plurality of colors by an encoding device of the transmitting device. According to an embodiment of the invention, the steps of the data transmission method further comprise that an initial bit and an end bit are added into the data by the encoding device. According to an embodiment of the invention, the steps of the data transmission method further comprise that a plurality of colors comprised in the color pattern are sequentially displayed by a color displaying device of the transmitting device. According to an embodiment of the invention, the color displaying device may be a display device. According to an embodiment of the invention, the color displaying device may be an LED device.

According to an embodiment of the invention, the steps of the data transmission method further comprise that an image extracting device of the receiving device is configured to extract the color pattern. According to an embodiment of the invention, the steps of the data transmission method further comprise that a decoding device of the receiving device is configured to decode the color pattern extracted by the image extracting device to obtain the data. According to an embodiment of the invention, the steps of the data transmission method further comprise that the decoding device is configured to calculate the average of the pixel values of a plurality of frames of images every n frames, wherein a plurality of frames of images are obtained when the image extracting device extracts the color pattern, and n is an integer and is greater than or equal to 2.

According to an embodiment of the invention, if the data which is transmitted by the transmitting device is address data, the steps of the data transmission method further comprise that when the receiving device obtains the address data, the receiving device is configured to establish a connection with the transmitting device according to the address data.

According to the data transmission method provided in the embodiments of the invention, the transmitting device can encode the transmitted data into a color pattern. The receiving device can obtain the color pattern through its image extracting device, and decodes the color pattern to obtain the data. Therefore, the data transmission is performed between electronic devices may be more convenient.

Use of ordinal terms such as "first", "second", "third", etc., in the disclosure and claims is for description. It does not by itself connote any order or relationship.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects, any suitable computer-program product may comprise a computer-readable medium comprising codes relating to one or more of the aspects of the disclosure. In some aspects, a computer software product may comprise packaging materials.

The above paragraphs describe many aspects. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data transmission system, comprising:
    a transmitting device, encoding data into a color pattern, and displaying the color pattern, wherein the transmitting device comprises:
    an encoding device, wherein the encoding device encodes the data into the color pattern based on a plurality of colors and inserts a relay bit between characters of the data; and
    a color displaying device, wherein the color displaying device sequentially displays the plurality of colors comprised in the color pattern; and
    a receiving device, extracting the color pattern and decoding the color pattern to obtain the data, wherein the receiving device comprises:
    an image extracting device to extract the color pattern; and
    a decoding device to decode the color pattern extracted by the extracting device to obtain the data.

2. The data transmission system of claim 1, wherein when the encoding device encodes the data, the encoding device adds an initial bit and an end bit into the data.

3. The data transmission system of claim 1, wherein the color displaying device is a display device or a light-emitting diode (LED) device.

4. The data transmission system of claim 1, wherein the decoding device calculates average of the pixel values of a plurality of frames of images every n frames, wherein the plurality of frames of images are obtained when the image extracting device extracts the color pattern, and n is an integer and is greater than or equal to 2.

5. The data transmission system of claim 1, wherein the data is address data, and when the receiving device obtains the address data, the receiving device establishes a connection with the transmitting device according to the address data.

6. A data transmission method, comprising:
    encoding, by an encoding device of a transmitting device, a data into a color pattern based on a plurality of colors and inserting a relay bit between characters of the data;
    sequentially displaying, by a color displaying device of the transmitting device, the plurality of colors comprised in the color pattern;
    extracting, by an image extracting device of a receiving device, the color pattern; and
    decoding, by a decoding device of the receiving device, the color pattern to obtain the data.

7. The data transmission method of claim 6, further comprising:
    adding, by the encoding device, an initial bit and an end bit into the data.

8. The data transmission method of claim 6, wherein the color displaying device is a display device or a light-emitting diode (LED) device.

9. The data transmission method of claim 6, further comprising:
    calculating, by the decoding device, the average of the pixel values of a plurality of frames of images every n frames, wherein the plurality of frames of images are obtained when the image extracting device extracts the color pattern, and n is an integer and is greater than or equal to 2.

10. The data transmission method of claim 6, wherein the data is address data, and the data transmission method further comprises:
    when the receiving device obtains the address data, establishing, by the receiving device, a connection with the transmitting device according to the address data.

* * * * *